UNITED STATES PATENT OFFICE.

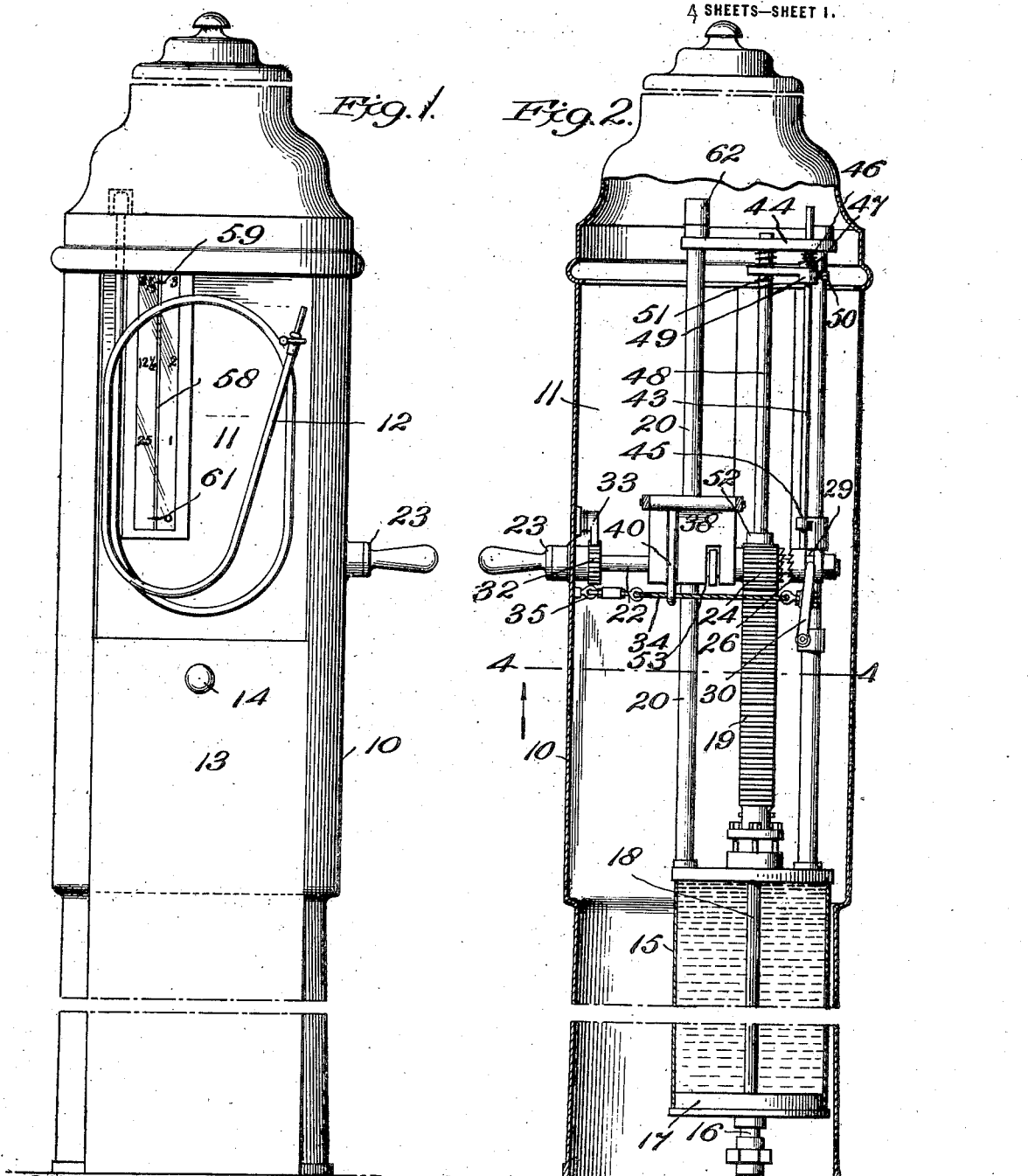

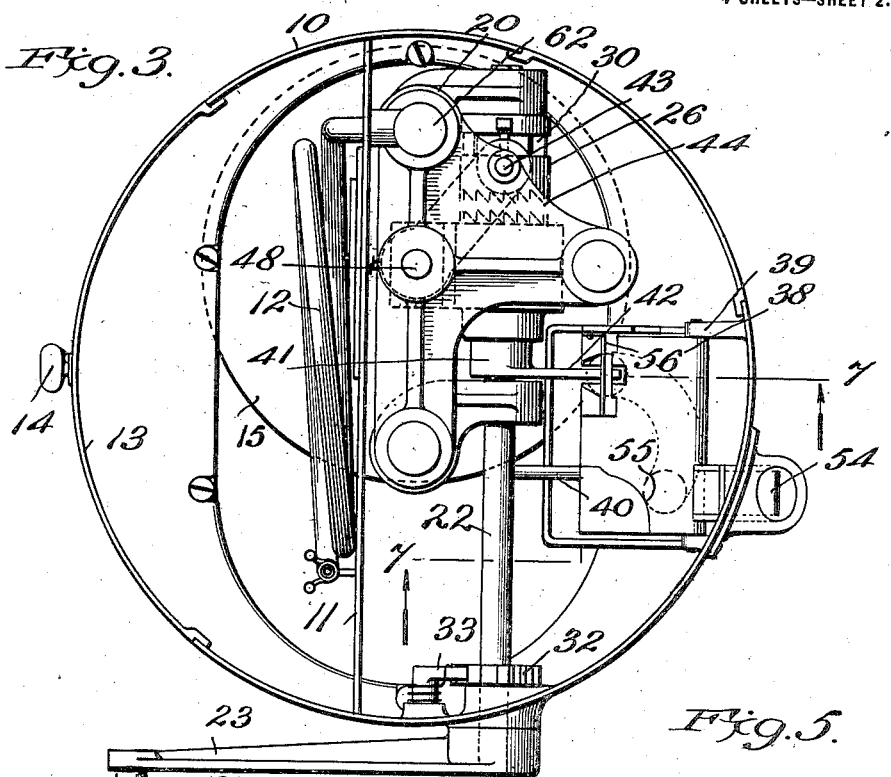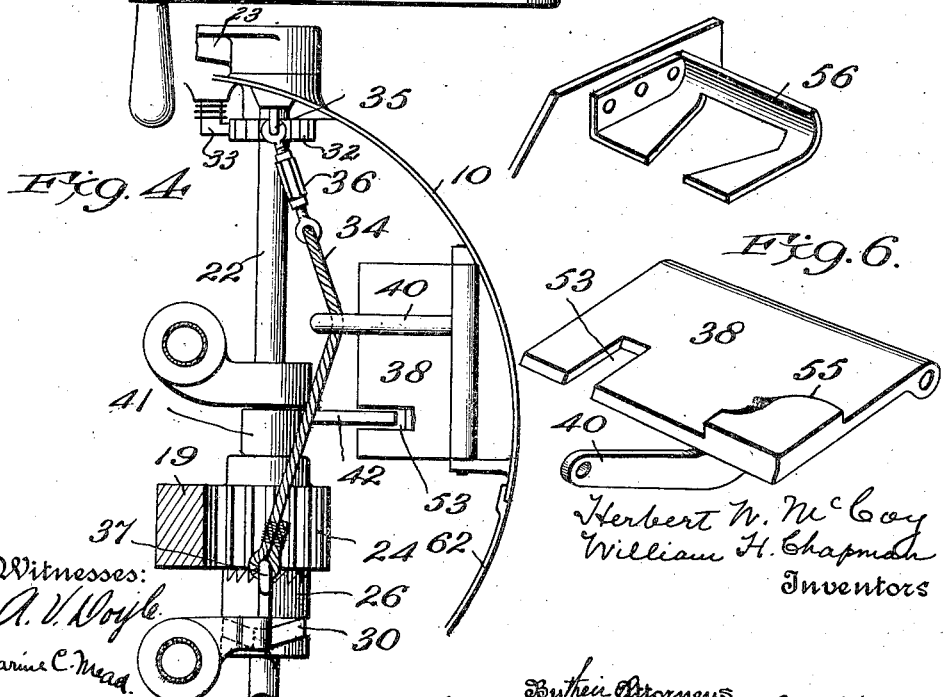

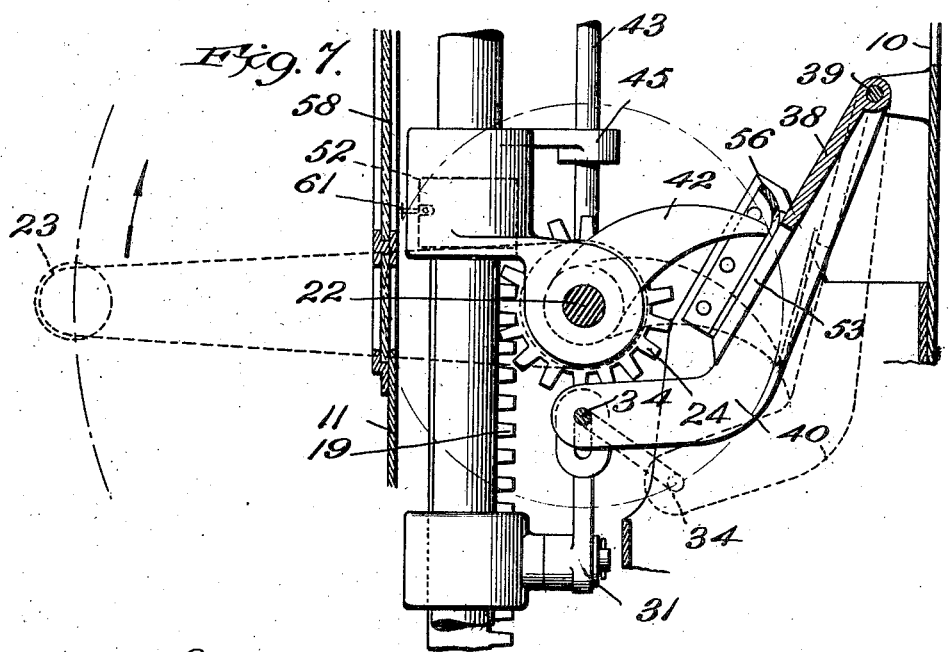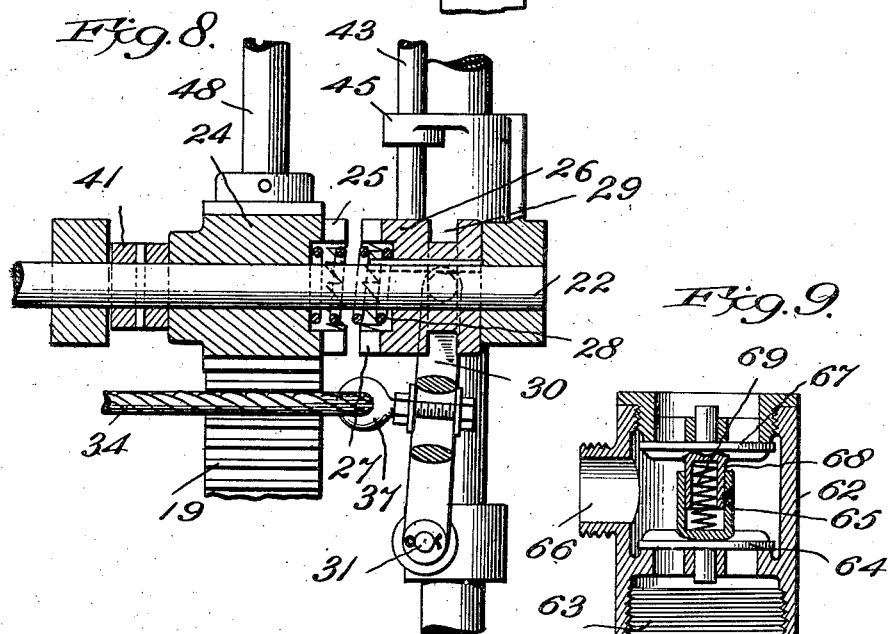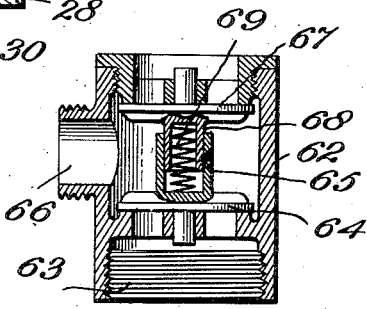

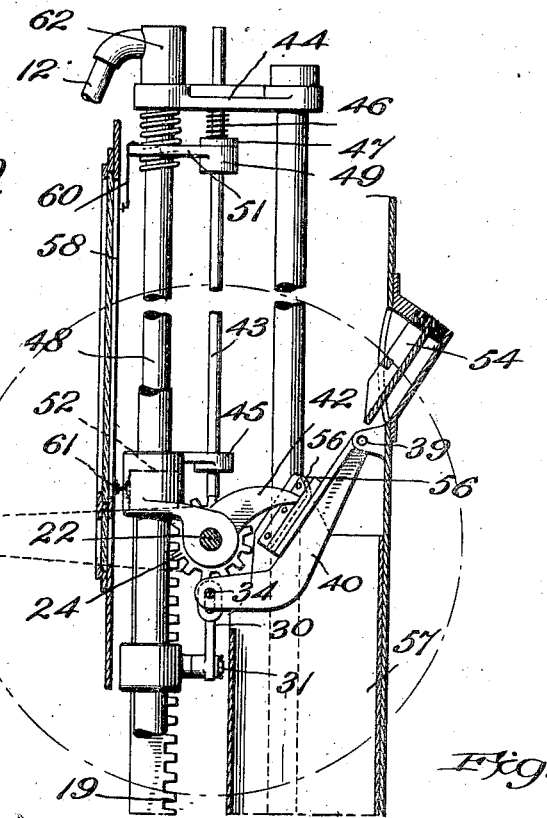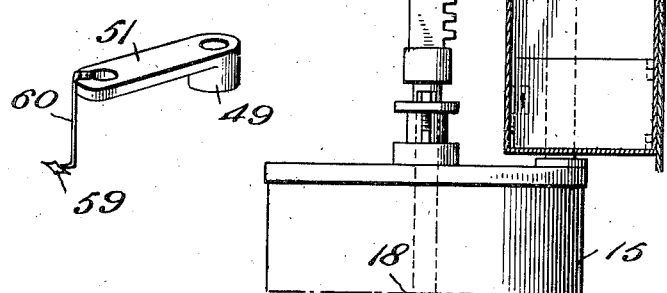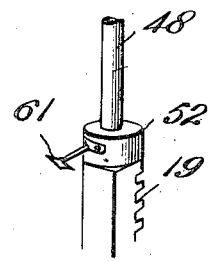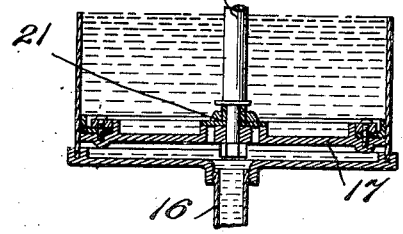

HERBERT W. McCOY AND WILLIAM H. CHAPMAN, OF PEEKSKILL, NEW YORK.

MEASURING-PUMP.

1,210,183. Specification of Letters Patent. Patented Dec. 26, 1916.

Application filed December 7, 1914. Serial No. 875,760.

*To all whom it may concern:*

Be it known that we, HERBERT W. MCCOY and WILLIAM H. CHAPMAN, citizens of the United States, and both residing at Peekskill, in the State of New York, have invented certain new and useful Improvements in Measuring-Pumps; and we do hereby declare the following to be a full, clear, and exact description of the invention, such as will enable others skilled in the art to which it appertains to make and use the same.

The present invention relates to an improved apparatus whereby a predetermined volume of oil, gasolene or other liquid may be measured and delivered at a single operation, and whereby this volume may be varied at will by simple adjustments of the machine.

The invention has more particular reference, in its preferred form to a complete coin-controlled apparatus capable of delivering a certain quantity of liquid in return for each coin deposited in the machine, while permitting adjustment from time to time to vary the amount delivered at each operation, in conformity with price fluctuations. By use of this improvement, therefore, a volume of liquid having a given fixed value may always be delivered, on use of a single coin of that value; adjustments not available to the public being made when changes of price occur.

The improved apparatus in question is simple, reliable and relatively inexpensive. A further advantage which it possesses lies in the fact that it conforms in its general structural type to standard pumps already in wide use.

While the present invention is not confined in scope to the details hereinafter described, a preferred embodiment is shown in the accompanying drawings wherein—

Figure 1 is a side elevation of the device with the main or delivery door open, Fig. 2 is a similar view from the opposite side, and with a portion of the outer casing removed, Fig. 3 is a plan view with the top of the casing removed, Fig. 4 is a partial sectional view on the plane 4—4 of Fig. 2, as seen looking upward, Figs. 5 and 6 are perspective views of details of the coin handling elements, Fig. 7 shows the principal operating parts on a large scale as viewed in section on the plane 7—7 in Fig. 3, and Fig. 8 shows the clutch in vertical section, Fig. 9, is a similar sectional view of the preferred air valve, Fig. 10 is a vertical sectional view on the plane 7—7 in Fig. 3, the working cylinder being shown partly in elevation and partly in median vertical section, and Figs. 11 and 12 show certain details of the preferred indicator.

The preferred outer sheet metal casing 10 is preferably divided by a vertical partition 11, on one side of which are placed the working parts, and on the opposite side of which the delivery of liquid takes place, for instance through the flexible hose 12. This latter compartment is accessible to the public through the door 13, which may be slid downward as shown in Fig. 1, by the handle 14.

The oil or other liquid to be delivered is contained in a cylinder 15 near the bottom of the casing 10, which cylinder is supplied through a pipe 16. The piston 17 slides within this cylinder, being actuated by the piston rod 18 carrying at its upper end the rack 19. When the piston 17 rises, the oil above it is forced upward through the delivery pipe 20 to the hose 12, in a well known manner; while at the same time, a new supply of oil enters below the piston. The upward opening automatic valve 21 on the piston permits downward movement thereof on the return stroke, in a well known manner.

The operation of lifting the piston for the above purpose is primarily accomplished by means of the operating shaft 22, turned by means of the handle or crank 23, or by any suitable means. Upon the shaft 22 is loosely mounted the spur gear 24, meshing with the rack 19, and having horizontally projecting beveled teeth 25 at one end, whereby said gear is made the stationary member of a clutch. The movable member of the clutch is found in the sleeve 26, having teeth 27 to engage the teeth 25, and so keyed to the shaft 22 as to be capable of sliding along it without turning upon it. The spring 28 acts normally to hold the clutch members apart. The sleeve 26 is furnished with an annular groove 29 engaged in a well known manner by the ends of the fork 30 which is pivotally mounted at 31. A pawl 32 and ratchet 33 prevent the shaft 22 from being turned backward. The arrow in Fig. 7 shows the direction of operative movement of the crank.

In order to make it possible to raise the piston to deliver the required quantity of oil, and to suitably limit the amount delivered, the following elements are employed: A flexible cord or cable 34 has one end fixed at 35, and is preferably furnished with an adjusting turnbuckle 36. The other end of the cable 34 is fastened to an eye 37 bolted to the fork 30. (See Figs. 4 and 8). A swinging frame 38 is pivoted or hinged at 39 on the casing 10, and the cable 34 passes through an opening in the end of the extension or arm 40 carried by said frame. Fixed on the shaft 22 is a hub 41 carrying a beak 42, so placed that, as the shaft 22 revolves, the end of the beak causes the frame 38 to swing backward from full line to dotted line position as shown in Fig. 7. As the frame 38 swings backward it draws the cable 34 with it, as shown in Fig. 4, and this operates through the fork 30 to bring together the teeth of the two clutch members, thereby uniting the gear 24 to the shaft 22 so that the two turn together. (See Fig. 4). In order to preserve this closed position of the clutch a suitable lock is employed, comprising preferably a bar 43, sliding vertically in guides 44, 45, and preferably pressed downward by a spring 46, acting upon a suitable shoulder 47. When the clutch 24, 26, is closed, the lower end of the bar 43 locks it, as for instance by dropping into the annular groove or channel 29. (See Fig. 8). Connection between the shaft 22 and gear 24 having been thus established, further revolution of the shaft lifts the piston 17, and delivery of oil through the hosepipe 12 will continue until the clutch is unlocked. In the meantime, of course, the frame 38 remains in the position shown in dotted lines in Fig. 7, and the beak 42 passes said frame idly, as the shaft 22 revolves.

The unlocking of the clutch is preferably accomplished by causing the bar 43 to be lifted by a stem 48 forming an upward continuation of the rack 19 (see Fig. 2). For this purpose a hub 49 is carried by the bar 43 and is fixed thereon in any desired position by a set screw 50, or otherwise. This hub carries an arm 51, which extends over a shoulder 52 on the stem 48 best shown in Fig. 10. When the rack 19 moves upward, the shoulder finally acts upon the arm 51 and lifts the bar 43, thus unlocking the clutch. The spring 28 then separates the clutch members, discontinuing further movement of the rack and piston. It is clear that, by adjusting the position of the hub 49 on the lock bar 43, the amount of oil delivered in a single cycle of operation as above described can be predetermined. It is to be understood that, when the clutch members separate, the sleeve 26 acts through the fork 30 and cable 34 to return the swinging frame 38 to full line position in Fig. 7, preparatory to another cycle of operation.

It is within the scope of the claims hereinafter set forth to accomplish the above cycle of operations without coin control, but for the purpose of preventing repetition of operation of the machine except by insertion of a proper coin, the following further details of construction are employed. As clearly shown in Figs. 4 and 6, the frame 38 is pierced at 53 opposite the beak 42; so that, as this latter revolves it passes idly through the opening thus afforded. In order to operate the frame 38 as above described, therefore, the opening 53 must be blocked. For this purpose there is placed above the inclined frame 38 a similarly inclined coin-chute 54, so placed that a coin dropped into it falls first upon a shoulder 55 on the frame 38, and rebounds therefrom (in a path indicated in dotted lines in Fig. 3) so as to drop between the inclined edges of a fixed coin guiding plate 56, shown best in Figs. 3, 5 and 10. Normally the frame 38 presses lightly upward against the inclined under surface of this guiding plate.

From the above it will be seen that, in order to operate the complete device as shown, the coin is first dropped into place to block the opening 53, being held there by the guiding plate 56. The handle 23 is then turned, bringing the beak 42 into contact with the coin, by means of which the frame 38 is pressed backward, away from the plate 56, while the coin is held firmly against said frame. This closes the clutch and permits the operation above described. At the same time, as soon as the beak 42 passes the coin, the coin drops from the frame 38 into an appropriate receptacle 57. (See Fig. 10). In consequence, the next time the beak 42 makes a revolution it passes idly through the opening 53, and, after a single operation of the pump, followed as aforesaid, by unlocking of the clutch, no further action is possible until the opening 53 is closed once more by a coin. It is to be understood that, as soon as the pinion 24 is freed by the opening of the clutch, the rack and piston return to their lowest position by their own weight.

It is preferred to supply an indicator whereby the adjustment of the quantity to be delivered by each operation may be gaged. Various means may be employed, and that shown in the accompanying drawings by way of example is constructed as follows: A narrow vertical slit 58 is made in the partition 11, and on one or both sides thereof, toward the door 13, are placed suitable graduations and identifying characters designating gallons, quarts or other units, either of volume or value. A fine pointer 59 projects through the slot 58, and is carried by an extension 60 of the arm 51. By this means the position of the hub 50 on the locking bar is ascertained, with due relation to the quantity to be delivered. In order that the position of the rack and piston may be ascertainable at all times, so that no operation may be commenced before full return to lowermost position, a pointer 61 may be fixed to a suitable part of the rack or its extension, which pointer may project through the slot 58, as shown in Fig. 1. Any suitable door may be provided to give authorized persons access to the working parts behind the partition 11.

Figs. 3 and 10 show a slightly modified arrangement of the pointers herein, instead of projecting through a slit in an opaque graduated plate, they move behind a graduated glass plate. Either arrangement can, of course, be used.

It is preferred to provide means for insuring complete emptying of the hose pipe, where such is used; and for this purpose a valve casing 62 is shown at the top of the discharge pipe 20. As shown in Fig. 9 this casing has a threaded opening 63 to fit upon the pipe 20, over which is a puppet valve 64 opening upward, and provided with a cup 65. The branch opening 66 leads to the hose pipe. The top of the casing 62 is closed by a second puppet valve 67, opening downward, and also provided with a cup 68 fitting into the cup 65. A spring 69, within the cups supports the valve 67 and, when the valve 64 is closed this spring either barely holds the valve 67 closed or allows it to remain slightly open, so that the air is allowed to enter over any liquid left in the hose pipe after the valve 64 has closed. On the other hand, when the liquid is forced out by the pump, the valve 64 opens upward and firmly closes the valve 67.

What is claimed is—

1. In a measuring pump a cylinder, a piston movable therein, a piston rod thereon carrying an abutment, actuating means for said rod and piston, connecting means adapted to establish operative relation between said actuating means and said piston, a locking device adapted to hold said connecting means in its operative position, and means located in the path of movement of said abutment on the piston rod and mechanically connected with said locking device, said last named means being adapted, when moved by said abutment, to unlock said connecting means when said piston reaches a predetermined position in said cylinder.

2. In a measuring pump, a liquid expelling means, a revoluble shaft, a driving pinion, for the expelling means, normally loose on the shaft, a clutch on said shaft adapted to connect the same with said pinion, means operated by movement of the shaft for engaging said clutch, a lock for the clutch, an adjustable automatic means for producing a direct mechanical connection at a predetermined position of said expelling device between said expelling device and said lock, to unlock said clutch.

3. In a measuring pump, a liquid expelling means, a revoluble shaft, a driving pinion for the expelling means, normally loose on the shaft, a clutch on said shaft adapted to connect the same with said pinion, a swinging frame operatively connected with said clutch for engaging the same, a member on the shaft adapted to swing said frame, a lock for said clutch, and means mechanically connected with said expelling means for operating said lock to free said clutch, substantially as described.

4. In a measuring pump, a liquid expelling means, a revoluble shaft, a driving pinion for the expelling means normally loose on the shaft, a clutch on said shaft adapted to connect the same with said pinion, a swinging frame operatively connected with said clutch for engaging the same, a member on the shaft adapted to swing said frame, a lock for the clutch and automatic means operated by movement of the expelling means for unlocking said clutch, substantially as described.

5. In a measuring pump, a liquid expelling means, a revoluble shaft, a driving pinion for the expelling means normally loose on the shaft, a clutch on said shaft adapted to connect the same with said pinion, a shifting lever for the clutch, a cable having one end fixed and the other attached to said lever, a frame adapted to swing at right angles to said cable and connected therewith, and means on the shaft adapted to swing said frame, substantially as described.

6. In a measuring pump, a reciprocating piston for expelling liquid, a stem moving therewith, actuating means for said piston, connecting means adapted to establish operative relation between said actuating means and piston, a locking bar for said connecting means, and members on said bar and stem adapted to come in contact to lift the bar when the stem has made a predetermined movement, substantially as described.

7. In a measuring pump, a reciprocating piston for expelling liquid, a stem moving therewith, actuating means for said piston, connecting means adapted to establish operative relation between said actuating means and piston, a locking bar for said connecting means, and members on said bar and stem adapted to come in contact to lift the bar when the stem has made a predetermined movement, one of said members being adjustable upon its support, substantially as described.

8. In a measuring pump, a reciprocating piston for expelling liquid, a revoluble shaft, a pinion loose thereon, a rack meshing therewith and attached to said piston, a clutch on said shaft for engaging said pinion, a lock bar for said clutch and members on said rack and lock bar adapted to come in contact to lift said bar, substantially as described.

9. In a measuring pump, a reciprocating piston for expelling liquid, a revoluble shaft, a pinion loose thereon, a rack meshing therewith and attached to said piston, a clutch on said shaft for engaging said pinion, a lock bar for said clutch and members on said rack and lock bar adapted to come in contact to lift said bar, one of said members being adjustable upon its support, substantially as described.

10. In a measuring pump, a reciprocating piston for expelling liquid, a revoluble shaft, a pinion loose thereon, a rack meshing therewith and attached to said piston, a clutch on said shaft for engaging said pinion, a lock bar for said clutch, an adjustable arm on said lock bar and means on said rack adapted to make contact with said arm to lift said bar, substantially as described.

11. In a measuring pump, a liquid expelling means, actuating means therefor, a connecting device between the expelling means and the actuating means, a locking bar for said device, automatic means for lifting the bar including an arm adjustably supported by said bar, and an indicator comprising a plate and a pointer fixed to said arm and adapted to move along said plate, substantially as described.

12. In a measuring pump, a rack, a liquid expelling piston thereon, a revoluble shaft, a pinion thereon meshing with said rack, a clutch on said shaft for engaging said pinion and having a recess, a slidably mounted lock bar adapted to engage said recess when the clutch is closed, and means automatically operated by movement of said rack for lifting said lock bar out of said recess, substantially as described.

13. In a measuring pump a reciprocating liquid expelling piston and rod, actuating means therefor, connecting means adapted to establish operative relation between said actuating means and said piston rod, a locking bar parallel to said piston rod adapted to hold said connecting means in operating position, adjustable means on the locking bar operated by movement of the piston rod for actuating the locking device to unlock the connecting means, an indicator plate parallel to said piston rod, a pointer for said indicator carried by said piston rod and a second pointer carried by the adjustable unlocking means.

14. In a measuring pump, an oil cylinder, a piston within it, a vertical piston rod having a rack, a horizontal operating shaft, a pinion loosely mounted thereon meshing with said shaft, a clutch for connecting and disconnecting said pinion with relation to the shaft, means for preventing reverse movements of the shaft, a vertical locking bar for said clutch, and means for establishing mechanical connection between said locking bar and piston rod for unlocking said clutch; said piston, piston rod and rack being adapted to return to their lowermost position by their own weight.

15. In a measuring pump, an oil cylinder, a piston within it, a piston rod, a revoluble shaft, operative connecting means including a clutch, between said shaft and piston rod, a locking bar for said clutch, a member movable along said bar adapted to receive pressure from said piston rod to unlock the clutch, an index, and a pointer connected with said member on the bar and moving along said index to indicate the position of said member.

In testimony whereof, we affix our signatures, in presence of two witnesses.

HERBERT W. McCOY.
WILLIAM H. CHAPMAN.

Witnesses:
FRANK UNDERWOOD,
FRANK HUBBELL CHAPMAN.